(12) United States Patent
Holman et al.

(10) Patent No.: US 6,863,634 B2
(45) Date of Patent: Mar. 8, 2005

(54) TANDEM AXLE POWER DIVIDER ASSEMBLY WITH INBOARD SLIP DRIVESHAFT CONNECTION

(75) Inventors: James L. Holman, Wauseon, OH (US); George A. Willford, Waterville, OH (US)

(73) Assignee: Dana Corporation, Toledo, OH (US)

( * ) Notice: Subject to any disclaimer, the term of this patent is extended or adjusted under 35 U.S.C. 154(b) by 9 days.

(21) Appl. No.: 10/408,410

(22) Filed: Apr. 7, 2003

(65) Prior Publication Data

US 2003/0190992 A1 Oct. 9, 2003

Related U.S. Application Data

(60) Provisional application No. 60/371,074, filed on Apr. 9, 2002.

(51) Int. Cl.[7] .............................................. B60K 17/36
(52) U.S. Cl. ..................... 475/221; 475/222; 180/24.12
(58) Field of Search ............................... 475/221, 222; 180/24.09, 24.12; 464/162, 182

(56) References Cited

U.S. PATENT DOCUMENTS

| | | |
|---|---|---|
| 1,106,149 A | 8/1914 | Loomis |
| 1,657,510 A | 1/1928 | Leipert |
| 1,838,557 A | 12/1931 | Kohler |
| 2,147,145 A | 2/1939 | Carlson et al. |
| 2,178,900 A | 11/1939 | Starr |
| 2,267,562 A | 12/1941 | Higgins |
| 3,015,970 A | 1/1962 | Mueller |
| 3,572,154 A | 3/1971 | Bartolomucci |
| 4,095,675 A | 6/1978 | Bell |
| 4,227,427 A | 10/1980 | Dick |
| 4,468,981 A | 9/1984 | Ries |
| 4,733,578 A | 3/1988 | Glaze et al. |
| 4,754,847 A * | 7/1988 | Glaze et al. ............... 184/6.12 |
| 5,098,355 A | 3/1992 | Long |
| 5,114,248 A | 5/1992 | Harsdorff |
| 5,772,520 A * | 6/1998 | Nicholas et al. ............ 464/162 |
| 5,913,745 A | 6/1999 | Inagaki et al. |
| 6,093,127 A | 7/2000 | DiDomenico et al. |
| 6,514,169 B2 | 2/2003 | Turner et al. |

FOREIGN PATENT DOCUMENTS

EP          0 420 392 A2      4/1991

OTHER PUBLICATIONS

European Search Report dated Aug. 18, 2004 issued in European Patemt Application No. 03252244.3.

* cited by examiner

*Primary Examiner*—Richard M. Lorence
(74) *Attorney, Agent, or Firm*—Dykema Gossett PLLC

(57) ABSTRACT

A tandem axle assembly capable of accommodating variations in driveline length is provided. The tandem axle assembly includes forward and rear axle assemblies each having a wheel differential with the forward axle assembly further including an inter-axle differential for dividing power between the two wheel differentials. A male-female slip connection is formed between two members at one or more of the following intersections: the connection between a power input shaft driving the inter-axle differential and a power transmission shaft for transferring power from a vehicle driveshaft to the power input shaft; the connection between an output shaft driven by the inter-axle differential and an output yoke of an intermediate drive shaft assembly extending between the forward and rear axle assemblies; and the connection between an input yoke of the intermediate drive shaft assembly and a pinion shaft in the rear axle assembly drivingly coupled to the rear wheel differential.

21 Claims, 8 Drawing Sheets

TANDEM AXLE POWER DIVIDER ASSEMBLY WITH INBOARD SLIP DRIVESHAFT CONNECTION

This application claims priority to U.S. Provisional Patent Application Ser. No. 60/371,074 filed Apr. 9, 2002.

BACKGROUND OF THE INVENTION

1. Field of the Invention

This invention relates to tandem axle assemblies and, in particular, to a tandem axle assembly designed to accommodate variations in length along the vehicle driveline during movement of a vehicle.

2. Discussion of Related Art

A conventional tandem axle assembly includes forward and rear axle assemblies and an intermediate drive shaft assembly connecting the two axle assemblies. The forward and rear axle assemblies each include a pair of axle half shafts extending therefrom on which one or more wheels of a vehicle are mounted. Each of the forward and rear axle assemblies further include a differential that allows the vehicle wheels on each axle assembly to rotate at different speeds. Each of the differentials includes a pinion gear in mesh with a ring gear (which in turn drives a plurality of bevel gears to cause rotation of the axle half shafts). The pinion gears of the forward and rear axle assemblies are driven by an inter-axle differential housed with the forward axle assembly (with the rear axle assembly being driven by the inter-axle differential through the intermediate drive shaft assembly).

The forward axle assembly of the tandem axle assembly and the vehicle transmission are coupled to opposite end of a vehicle drive shaft assembly-typically through fixed end yokes and universal joints. During movement of the vehicle, movement of the rear axle assembly of the tandem axle assembly and movement of the vehicle suspension cause the length of the driveline extending between the transmission and rear axle assembly to vary. In conventional vehicles, this variation in length is accommodated by a splined slip connection within the drive shaft assembly. In particular, the drive shaft typically includes a female member having a plurality of splines and a male member having a corresponding plurality of splines and telescoped within the female member. The two members of the drive shaft are thereby able to move axially relative to one another and accommodate variations in the length of the driveline.

Forming the splined slip connection in the drive shaft assembly is disadvantageous. The drive shaft requires two separate parts and is relatively costly and heavy. Further the spline slip connection renders balancing of the driveshaft and driveline more difficult and increases runout of the driveshaft.

The inventors herein have recognized a need for a tandem axle assembly that will minimize and/or eliminate one or more of the above-identified deficiencies.

SUMMARY OF THE INVENTION

The present invention provides a tandem axle assembly.

A tandem axle assembly in accordance with the present invention includes a first axle assembly having a wheel differential and a pinion shaft drivingly coupled to the wheel differential. The tandem axle assembly further includes a second axle assembly having a wheel differential and an inter-axle differential configured to divide power between the wheel differentials of the first and second axle assemblies. A power input shaft is drivingly coupled to the inter-axle differential and an output shaft is driven by the inter-axle differential. A power transmission shaft is coupled to the power input shaft and a drive shaft assembly. The tandem axle assembly further includes an intermediate drive shaft having an output yoke driven by the output shaft and an input yoke drivingly coupled to the pinion shaft. One member from among the power transmission shaft, the power input shaft, the output shaft, the output yoke, the input yoke, and the pinion shaft defines a bore. Another member of the power transmission shaft, the power input shaft, the output shaft, the output yoke, the input yoke, and the pinion shaft extends into the bore with the one member axially movable relative to the another member. In one embodiment of the invention, the one member may comprise the power transmission shaft or the power input shaft and the another member may comprise the other of the power transmission shaft and the power input shaft. In another embodiment of the invention, the one member may comprise the output shaft or the output yoke and the another member may comprise the other of the output shaft and the output yoke. In yet another embodiment, the one member may comprise the input yoke or the pinion shaft and the another member may comprise the other of the input yoke and the pinion shaft.

A tandem axle assembly in accordance with the present invention is advantageous. In particular, the inventive assembly eliminates the need for a splined slip connection in the vehicle driveshaft. As a result, the number of parts needed to construct the driveshaft is reduced as well as the cost and weight of the driveshaft and the time required for assembly. Further, driveshaft runout is reduced. Finally, elimination of the splined slip connection in the driveshaft improves driveline balance.

These and other advantages of this invention will become apparent to one skilled in the art from the following detailed description and the accompanying drawings illustrating features of this invention by way of example.

DETAILED DESCRIPTION OF ONE OR MORE EMBODIMENTS OF THE INVENTION

Figure 1:
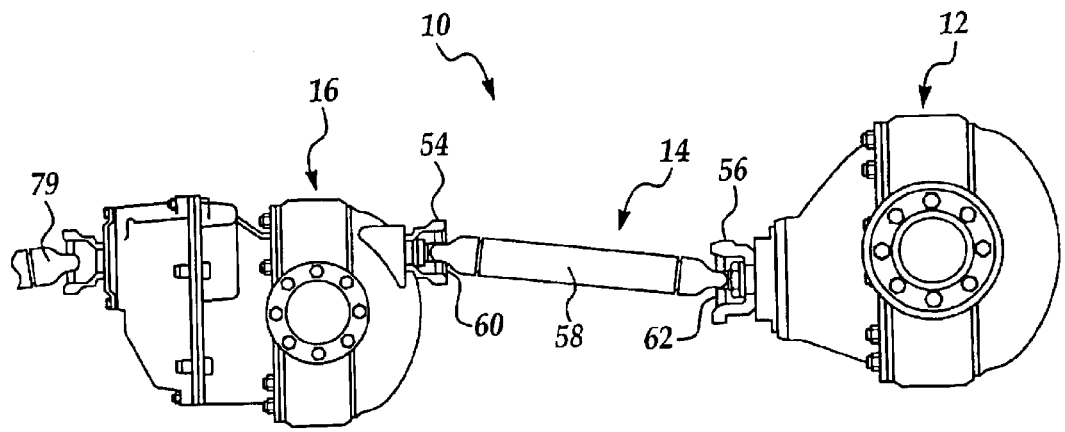
FIG. 1 is an side view of a tandem axle assembly in accordance with one embodiment of the present invention.

Referring now to the drawings wherein like reference numerals are used to identify identical components in the various views, FIG. 1 illustrates one embodiment of a tandem axle assembly 10 in accordance with the present invention. Axle assembly 10 is provided to support the frame (not shown) of a vehicle on a plurality of wheels (not shown). Assembly 10 is particularly adapted for use in medium and heavy trucks. It should be understood, however, that the present invention is not limited to use in heavy trucks and may be used in a wide variety of vehicles. Assembly 10 includes a rear axle assembly 12, an intermediate drive shaft assembly 14, and a forward axle assembly 16.

Figure 3:
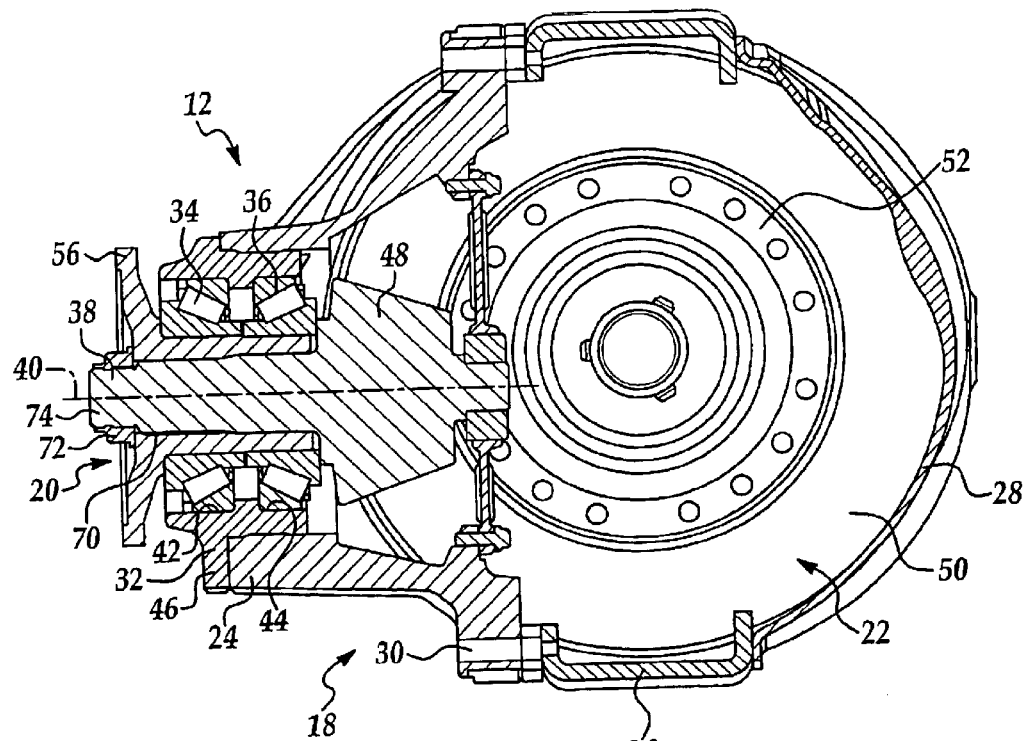
FIG. 3 is a cross-sectional view of the rear axle assembly of FIG. 1.

Rear axle assembly 12 is provided to drive wheels (not shown) supported on either side of assembly 12 on axle half shafts (not shown) extending from axle assembly 12. Referring to FIG. 3, assembly 12 may include a housing 18, a pinion shaft assembly 20 and a differential 22.

Housing 18 provides structural support for the other components of assembly 12. Housing 18 also protects the other components of assembly 12 from foreign objects and elements. Housing 18 may be made from conventional metals and metal alloys such as steel and may include multiple members 24, 26, 28 that are sized relative to components of assembly 12 and coupled together using conventional fasteners 30 during assembly of assembly 12.

Pinion shaft assembly 20 is provided to transfer torque from intermediate drive shaft assembly 14 to differential 22. Shaft assembly 20 may include a bearing cage 32, bearings 34, 36, and a pinion shaft 38.

Bearing cage 32 provides structural support and positions other components of assembly 20. Cage 32 may be made from conventional metals and metal alloys and is disposed about an axis 40 extending through pinion shaft 38. Cage 32 defines axially aligned openings 42, 44 configured to receive bearings 34, 36. Cage 32 also defines a mounting flange 46 through which cage 32 may be coupled to housing member 24 using one or more conventional fasteners (not shown) such as screws or bolts.

Bearings 34, 36 enable rotation of pinion shaft 38 relative to bearing cage 32. Bearings 34, 36 are conventional in the art and may comprise tapered roller bearings. Bearings 34, 36 are disposed within openings 42, 44 of cage 32.

Pinion shaft 38 transmits torque to differential 22 and is conventional in the art. Shaft 38 is disposed about axis 40 and is supported for rotation within openings 42, 44 of cage 32 by bearings 34, 36.

Differential 22 is provided to allow the wheels supported on either side of axle assembly 12 to rotate at different speeds. Differential 22 may include a pinion gear 48, a ring gear 50, and a conventional bevel gear set (not shown) disposed within a differential carrier 52.

Pinion gear 48 is provided to transfer torque from intermediate drive shaft assembly 14 to ring gear 50. Pinion gear 48 may be made from conventional metals and metal alloys and may comprise a hypoid gear. Gear 48 rotates about axis 40. Gear 48 is disposed about shaft 38 and may be integral therewith as shown in the illustrated embodiment or may be mounted thereto using a conventional spline connection or in other ways customary in the art.

Ring gear 50 is provided to transfer torque from pinion gear 48 to the bevel gear set and is conventional in the art. Ring gear 50 may also be made from conventional metals and metal alloys and may also comprise a hypoid gear. Gear 50 is affixed to carrier 52 or may be integral therewith.

Referring again to FIG. 1, intermediate drive shaft assembly 14 will be described in greater detail. Assembly 14 is provided to transfer torque to an output shaft of forward axle assembly 16 to rear axle assembly 12. Assembly 14 may include an output yoke 54 at a forward end, an input yoke 56 at a rear end, an intermediate drive shaft 58 between yokes 54, 56 and conventional universal joints 60, 62 for coupling drive shaft 58 to yokes 54, 56.

Figure 2:
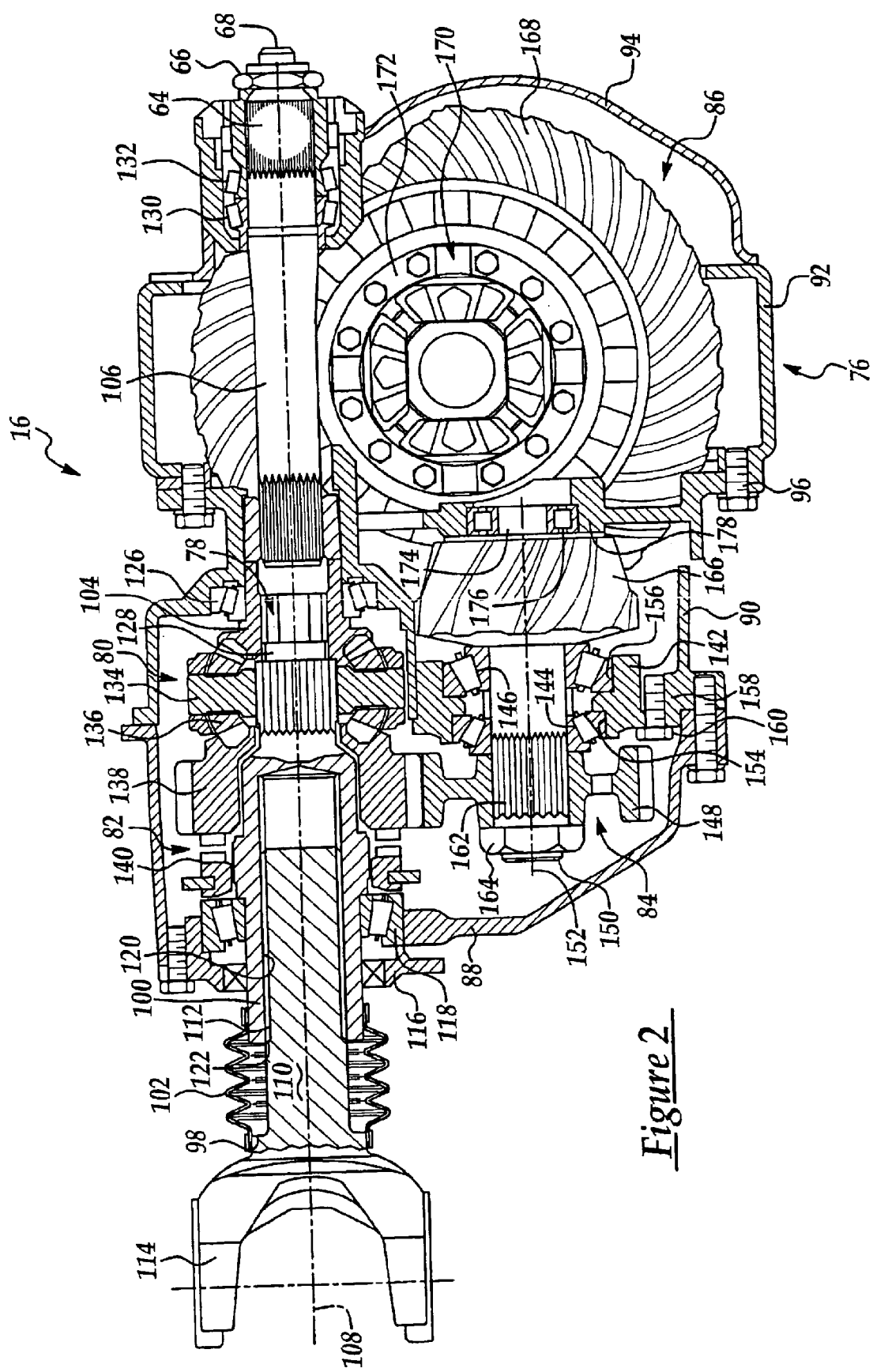
FIG. 2 is a cross-sectional view of the forward axle assembly of FIG. 1.

Output yoke 54 is provided to transmit power from an output shaft of forward axle assembly 16 to intermediate drive shaft 58. Referring to FIG. 2, yoke 54 may be splined to the rear end of the output shaft of axle assembly 16 on splines 64 and may be retained thereon by a nut 66 and a washer which are disposed about a threaded stud 68 that extends from the output shaft and is integral therewith. Referring again to FIG. 1, yoke 54 is coupled to shaft 58 through universal joint 60.

Input yoke 56 is provided to transmit power from intermediate drive shaft 58 to pinion shaft 38 of rear axle assembly 12. Referring to FIG. 3, yoke 56 may be splined to the forward end of pinion shaft 38 on splines 70 and may be retained thereon by a nut 72 and a washer which are disposed about a threaded stud 74 that extends from shaft 38 and is integral therewith. Referring again to FIG. 1, yoke 56 is coupled to shaft 58 through universal joint 62. Yoke 56 is configured to rotate about axis 40 extending through pinion shaft 38 and pinion gear 48 in rear axle assembly 12.

Intermediate drive shaft 58 transmits power between yokes 54, 56. Shaft is conventional in the art and is coupled to yokes through universal joints 60, 62.

Forward axle assembly 16 is provided to drive wheels (not shown) supported on either side of assembly 16 on axle half shafts (not shown) extending from axle assembly 16. Referring to FIG. 2, assembly 16 may include a housing 76, a shaft assembly 78 means, such as inter-axle differential 80, for dividing power between assembly 12 and assembly 16, a differential locking device, such as clutch 82, a pinion shaft assembly 84, and a differential 86.

Housing 76 provides structural support for the other components of assembly 16. Housing 76 also protects the other components of assembly 16 from foreign objects and elements. Housing 76 may be made from conventional metals and metal alloys such as steel and may include multiple members 88, 90, 92, 94 that are sized relative to components of assembly 16 and coupled together using conventional fasteners 96.

Shaft assembly 78 is provided to transmit power from a drive shaft at the forward end of drive axle assembly 16 to intermediate drive shaft assembly 14. In accordance with the present invention, assembly 78 includes a power transmission shaft 98, a power input shaft 100, a boot 102, a gear 104, and an output shaft 106.

Power transmission shaft 98 is provided to transmit power from the vehicle drive shaft assembly 79 to power input shaft 100. Shaft 98 may be made from conventional metals and metal alloys such as steel. Shaft 98 is disposed about a rotational axis 108 and has a generally circular body. Although shaft 98 is solid in the illustrated embodiment, it should be understood that shaft 98 may be tubular. A radially outer surface 110 of shaft 98 may define a plurality of splines 112 proximate one axial end for a purpose described in greater detail hereinbelow. A second axial end of shaft 98 may define a yoke 114 for coupling shaft 98 to the drive shaft assembly 79.

Figure 7:
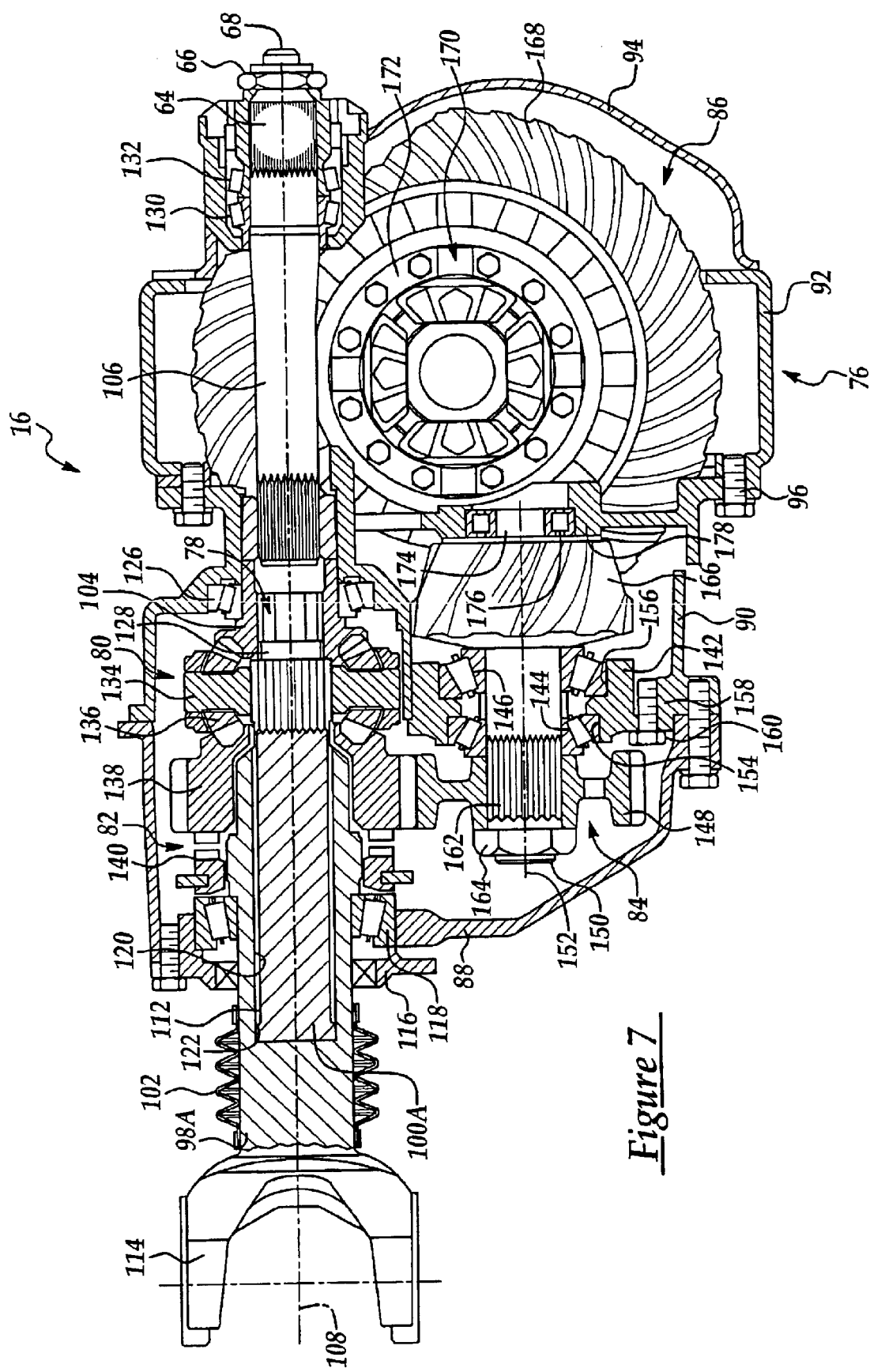
FIG. 7 is a cross-sectional view of a forward axle assembly of a tandem axle assembly in accordance with another embodiment of the present invention.

Power input shaft 100 is provided to transmit power from power transmission shaft 98 to inter-axle differential 80. Shaft 100 may also be made from conventional metals and metal alloys such as steel. Shaft 100 is disposed about axis 108 and may have a generally cylindrical body that extends outwardly from housing member 88 and is journalled for rotation within an end cap 116 by bearings 118. Shaft 100 defines an axially extending bore 120 that may be closed at one end. Bore 120 is sized to receive one axial end of power transmission shaft 98. A radially inner surface of shaft 100 may define a plurality of splines 122 configured to mate with splines 112 of power transmission shaft 98. The spline connection between shafts 98, 100 allows shafts 98, 100 to move axially relative to one another. It should be understood, however, that other structural relationships (e.g., a key and keyway) could be created between shafts 98, 100 to allow relative axial movement. It should also be understood that the male-female relationship of shafts 98, 100 may be reversed without departing from the spirit of the present invention as illustrated in FIG. 7. In other words, power transmission shaft 98A could define an axially extending bore having a plurality of splines on a radially inner surface while power input shaft 100A could be received within the bore and include a plurality of splines configured to mate with the splines on the power transmission shaft.

Figure 4:
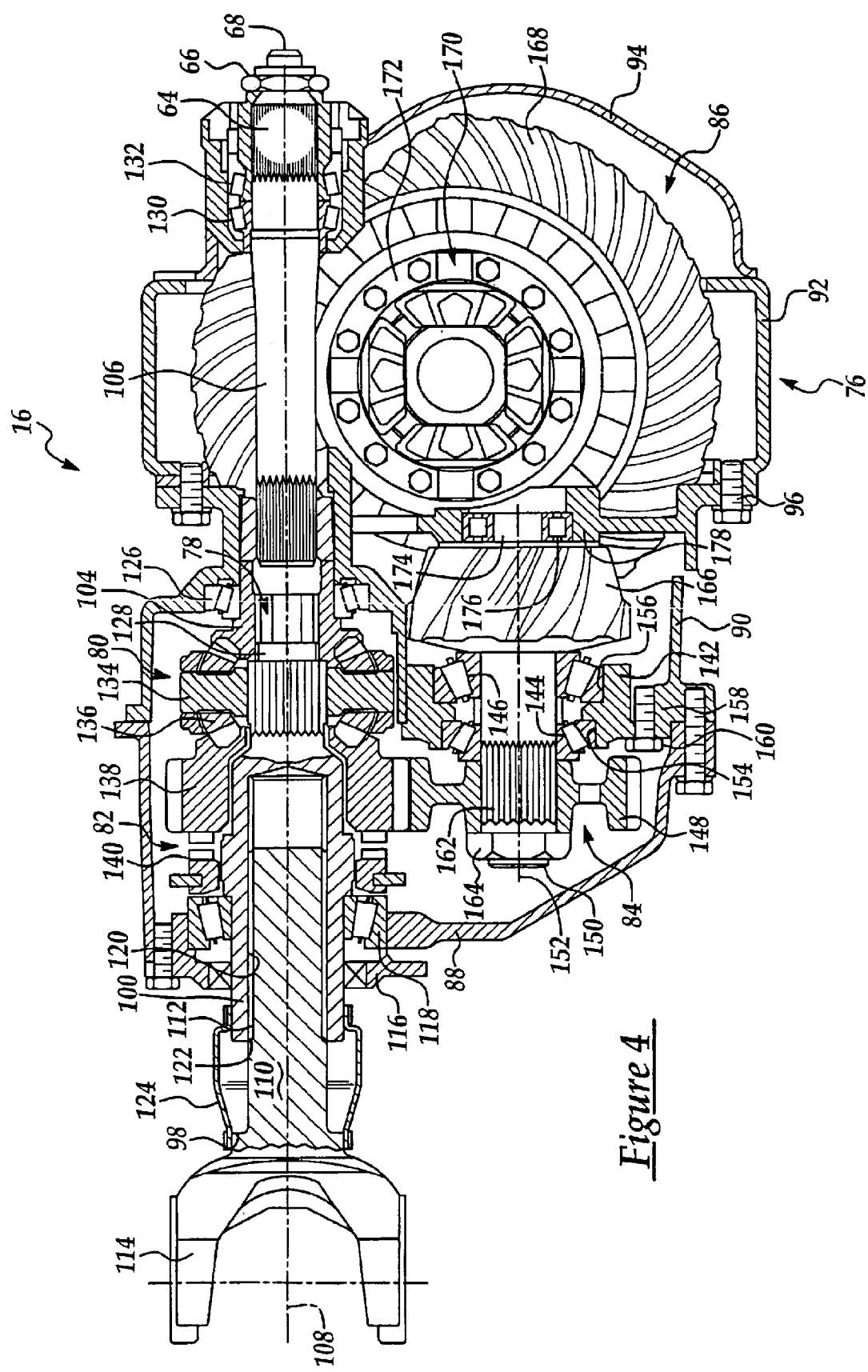
FIG. 4 is a cross-sectional view of the forward axle assembly of FIG. 1 illustrating an alternative structure for sealing the shaft assembly of the forward axle assembly.

Boot 102 acts as a seal between shafts 98, 100. Boot 102 is coupled to both power transmission shaft 98 and power input shaft 100 and is disposed about axis 108. The axial length of boot 102 is variable to allow for relative axial movement between shafts 98, 100. Referring to FIG. 4, a sliding seal 124 may be used as an alternative to boot 102.

Gear 104 transmits power received from inter-axle differential 80 to output shaft 106. Gear 104 is conventional in the art and may be made from conventional metals and metal alloys. Gear 104 is disposed about shaft 106 near the forward end of shaft 106 and may be coupled thereto by mating splines (not shown) on gear 104 and shaft 106. Gear 104 is journalled for rotation within housing member 92 by bearings 126.

Output shaft 106 is provided to transmit a portion of the power provided by power input shaft 100 to the intermediate drive shaft assembly 14. Shaft 106 is coaxially disposed relative to power input shaft 100 and includes a pilot portion 128 at its forward end on which power input shaft 100 is journalled. Shaft 106 extends through openings in housing members 90, 92, 94, respectively, and is journalled within an opening of housing member 94 by bearings 130, 132.

Inter-axle differential 80 is provided to divide power between assemblies 12, 16 and is conventional in the art. Differential 80 may include a spider 134, bevel gears 136, and an input gear 138.

Spider 134 provides a mounting arrangement for bevel gears 136 and is conventional in the art. Spider 134 may be coupled to power input shaft 100 for rotation therewith using a spline connection or in other ways customary in the art. Alternatively, spider 134 may be made integral with input shaft 100.

Bevel gears 136 are provided to divide and transfer torque from power input shaft 100 to input gear 138 and to gear 104 of shaft assembly 78. Gears 136 are conventional in the art and may be made from conventional metals and metal alloys. Gears 136 are mounted on spider 134 for rotation with spider 134 and input shaft 100. The teeth on gears 136 engage corresponding teeth on gear 104 of shaft assembly 78 and on input gear 138.

Input gear 138 transfers torque from inter-axle differential 80 to pinion shaft assembly 82. Gear 138 is also conventional in the art and may be made from conventional metals and metal alloys. Gear 138 is disposed about power input shaft 100 and is freely rotatable thereon, being journalled on shaft 100 by bearings (not shown). Gear 138 includes a first set of teeth on a forward planar surface which form a first member of clutch 82 and a second set of teeth disposed on a rear planar surface that engage the teeth of bevel gears 136. Gear 138 further includes a third set of teeth disposed about the radial periphery of gear 138 for a purpose described hereinbelow.

Clutch 82 is provided to selectively lock differential 80 and is conventional in the art. In the illustrated embodiment, clutch 82 comprises a conventional sliding dog clutch that may be engaged by shifting a clutch member 140 with a first set of teeth into engagement with a clutch member (gear 138 in the illustrated embodiment) having a second set of teeth using a shifting fork.

Pinion shaft assembly 84 transfers torque from shaft assembly 78 to differential 86. Assembly 84 may include a bearing cage 142, bearings 144, 146, a driven gear 148, and a pinion shaft 150.

Bearing cage 142 provides structural support and positions other components of assembly 84. Cage 142 may be made from conventional metals and metal alloys and is disposed about an axis 152 extending through pinion shaft 150. Cage 142 defines axially aligned openings 154, 156 configured to receive bearings 144, 146. Cage 142 also defines a mounting flange 158 through which cage 142 may be coupled to housing member 90 using one or more conventional fasteners 160 such as screws or bolts.

Bearings 144, 146 enable rotation of pinion shaft 150 relative to bearing cage 142. Bearings 144, 146 are conventional in the art and may comprise tapered roller bearings. Bearings 144, 146 are disposed within openings 154, 156 of cage 142 and are disposed about axis 152.

Driven gear 148 transmits torque from input gear 138 of inter-axle differential 80 to pinion shaft 150. Driven gear 148 may comprise a helical gear having teeth disposed about its radial periphery which engage corresponding teeth on input gear 138. Gear 148 may be drivingly coupled to shaft 150 through axially-extending splines 162 on shaft 150.

Pinion shaft 150 transmits torque to differential 86 and is conventional in the art. Shaft 150 is disposed about axis 152 and is supported for rotation within openings 154, 156 of cage 142 by bearings 144, 146. A forward axial end of shaft 150 may define an integral threaded stud configured to receive a nut 164 used to retain gear 148 on shaft 150.

Differential 86 is provided to allow the wheels supported on either side of axle assembly 16 to rotate at different speeds. Differential 86 may include a pinion gear 166, a ring gear 168, and a conventional bevel gear set 170 disposed within a differential carrier 172.

Pinion gear 166 is provided to transfer torque from pinion shaft 150 to ring gear 168. Pinion gear 166 may be made from conventional metals and metal alloys and may comprise a hypoid gear. Gear 166 rotates about axis 152. Gear 166 is disposed about shaft 150 and may be mounted thereto using a conventional spline connection or in other ways customary in the art. Gear 166 may also include a pilot portion 174 extending rearwardly that is supported for rotation by bearings 176 disposed in a pilot web 178 of housing member 92.

Ring gear 168 is provided to transfer torque from pinion gear 166 to the bevel gear set 170 and is conventional in the art. Ring gear 168 may also be made from conventional metals and metal alloys and may also comprise a hypoid gear. Gear 168 is affixed to carrier 172 or may be integral therewith.

Bevel gear set 170 is provided to transfer torque from ring gear 168 to the axle half shafts supporting the vehicle wheels. Gear set 170 is conventional in the art.

A tandem axle assembly 10 in accordance with the present invention provides several advantages. In particular, because the power transmission shaft 98 and power input shaft 100 of shaft assembly 78 in forward axle assembly 16 are axially movable relative to one another, the shaft assembly 78 is able to accommodate variations in driveline length resulting from movement of rear axle assembly 12 and the vehicle suspension. This function has typically been performed by a splined slip connection in the vehicle drive shaft assembly. Because the function is performed by axle assembly 10, the splined slip connection in the drive shaft assembly may be eliminated. This results in a reduction in part count in the drive shaft assembly as well as reduced weight, cost, and assembly time for the drive shaft assembly. Further, driveshaft runout is reduced and driveline balance improved.

While the invention has been shown and described with reference to one or more particular embodiments thereof, it will be understood by those of skill in the art that various changes and modifications can be made without departing from the spirit and scope of the invention. For example, the male-female relationship illustrated in shafts 98, 100 could be replicated in other areas of the driveline of tandem axle assembly 10 as discussed hereinbelow.

Figure 5:
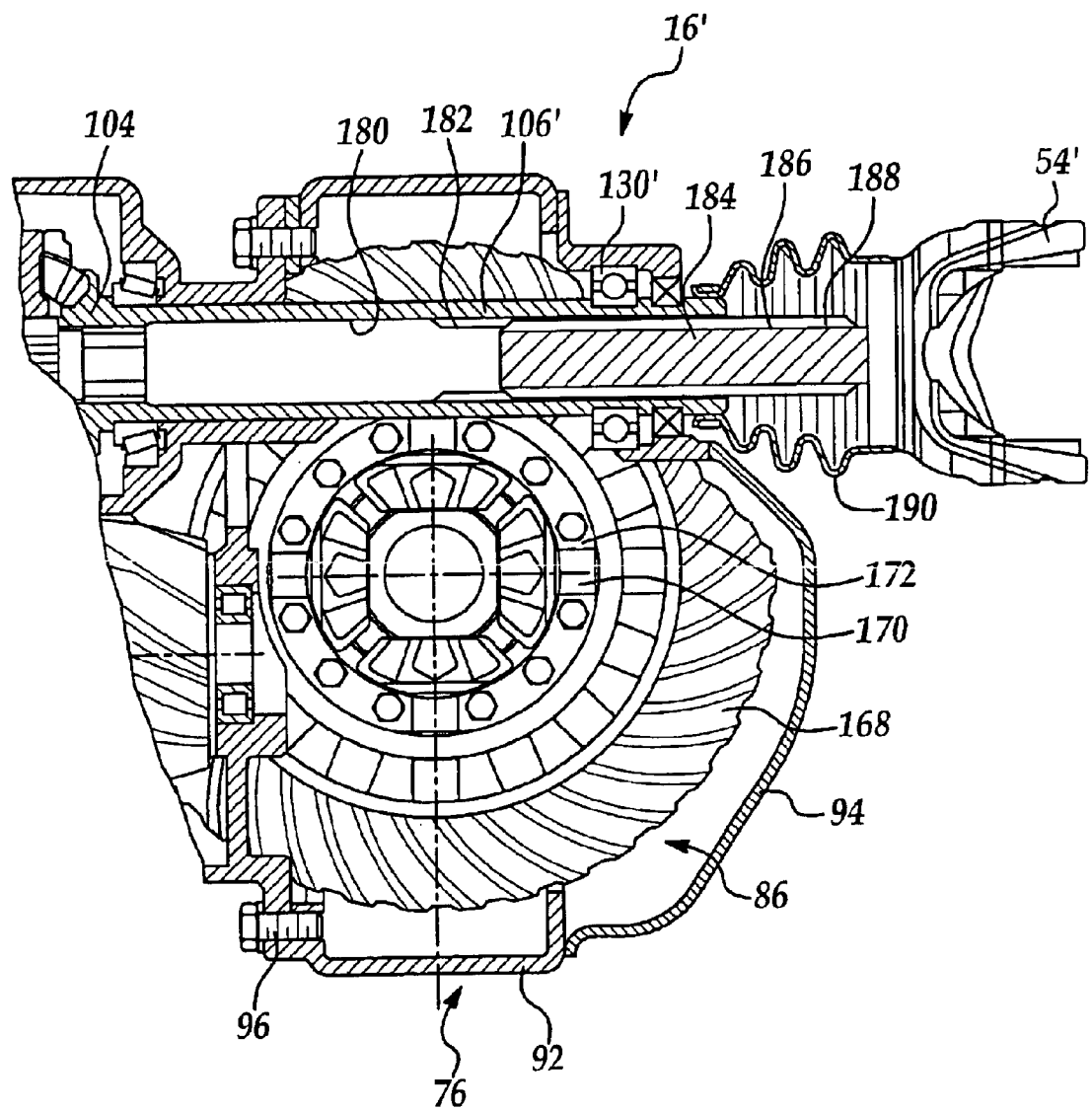
FIG. 5 is a cross-sectional view of a portion of a forward axle assembly of a tandem axle assembly in accordance with another embodiment of the present invention.

Referring now to FIG. 5, a portion of a forward axle assembly 16' for a tandem axle assembly in accordance with another embodiment of the present invention is illustrated. Axle assembly 16' is substantially similar to axle assembly 16 of tandem axle assembly 10. In axle assembly 16', however, the output shaft 106' and the output yoke 54' of intermediate drive shaft assembly 14 have been modified to provide a slip connection.

Output shaft 106' is again provided to transmit a portion of the power provided by power input shaft 100 to the intermediate drive shaft assembly 14. Shaft 106' is coaxially disposed relative to power input shaft 100. In the illustrated embodiment, shaft 106' forms an extension of output gear 104 and is integral therewith. Shaft 106' could alternatively be coupled to gear 104 for rotation therewith. Shaft 106' extends through openings in housing members 90, 92, 94, respectively, and is journalled within an opening of housing member 94 by bearings 130'. Shaft 106' defines an axially extending bore 180 that may be closed at one end. Bore 180 is sized to receive one axial end of yoke 54'. A radially inner surface of shaft 106' may define a plurality of splines 182.

Figure 8:
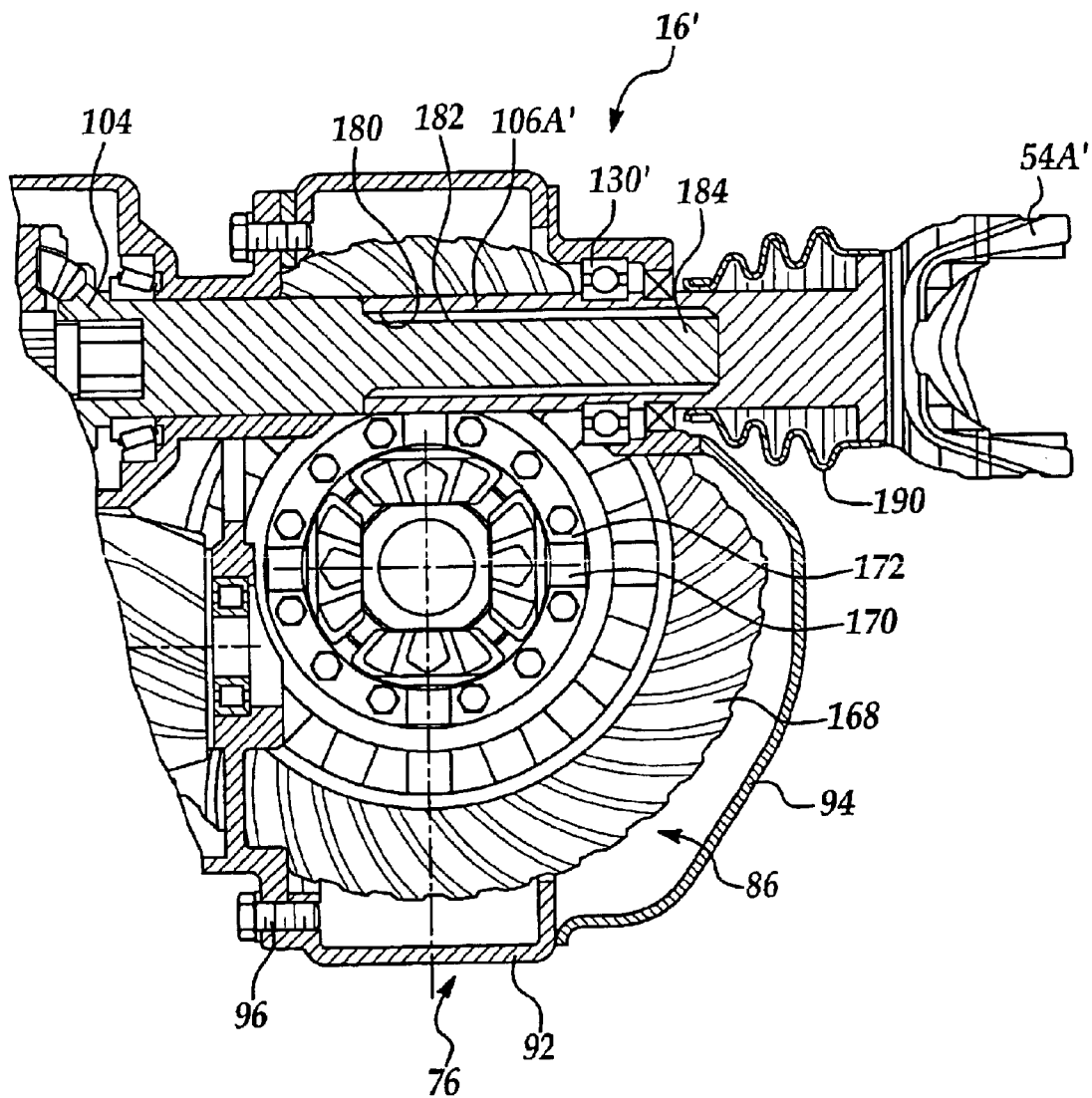
FIG. 8 is a cross-sectional view of a portion of a forward axle assembly of a tandem axle assembly in accordance with another embodiment of the present invention.

Yoke 54' is provided to transmit power from output shaft 106' of forward axle assembly 16' to intermediate drive shaft 58. Yoke 54' may include an axially extending yoke shaft 184 having a generally circular body. Although shaft 184 is solid in the illustrated embodiment, it should be understood that shaft 184 may be tubular. A radially outer surface 186 of shaft 184 may define a plurality of splines 188 proximate one axial end configured to mate with splines 182 of output shaft 106'. The spline connection between shaft 106' and yoke 54' allows shaft 106' and yoke 54' to move axially relative to one another. It should be understood, however, that other structural relationships (e.g., a key and keyway) could be created between shaft 106' and yoke 54' to allow relative axial movement. It should also be understood that the male-female relationship of shaft 106' and yoke 54' may be reversed as illustrated in FIG. 8 without departing from the spirit of the present invention. In other words, yoke 54'A could define an axially extending bore having a plurality of splines on a radially inner surface while output shaft 106'A could be received within the bore and include a plurality of splines configured to mate with the splines on the yoke 54'A.

A boot 190 acts as a seal between shaft 106' and yoke 54'. Boot 190 is coupled to both output shaft 106' and yoke 54' and is disposed about axis 108. The axial length of boot 190 is variable to allow for relative axial movement between shaft 106' and yoke 54'. As discussed hereinabove in connection with tandem axle assembly 10, a sliding seal may be used as an alternative to boot 190.

Figure 6:
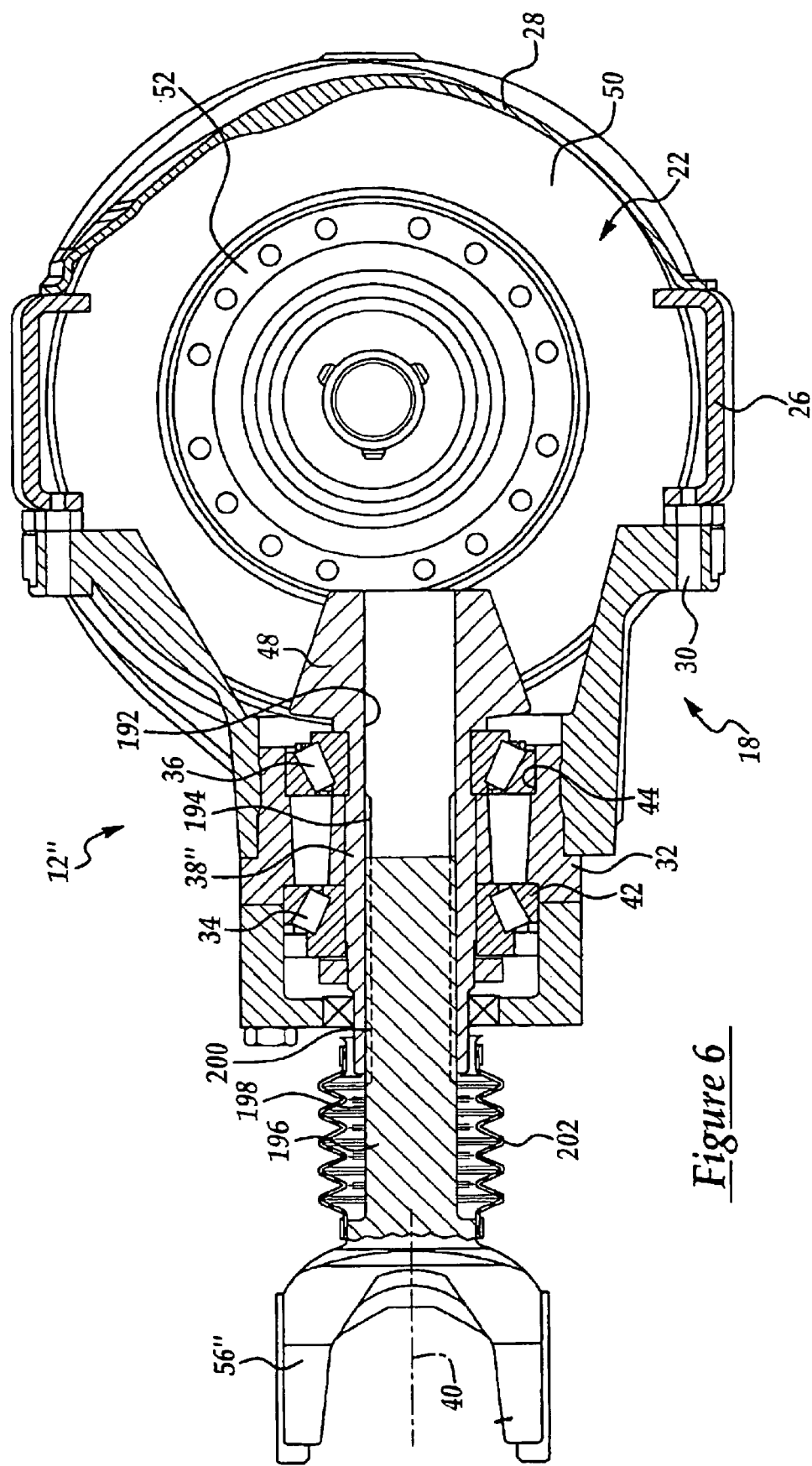
FIG. 6 is a cross-sectional view of a rear axle assembly of a tandem axle assembly in accordance with yet another embodiment of the present invention.

Referring now to FIG. 6, a portion of a rear axle assembly 12" for a tandem axle assembly in accordance with another embodiment of the present invention is illustrated. Axle assembly 12" is substantially similar to axle assembly 12 of tandem axle assembly 10. In axle assembly 12", however, the pinion shaft 38" and the input yoke 56" of intermediate drive shaft assembly 14 have been modified to provide a slip connection.

Pinion shaft 38" transmits torque to differential 22. Shaft 38" is disposed about axis 40 and is supported for rotation within openings 42, 44 of bearing cage 32 by bearings 34, 36. Shaft 38" defines an axially extending bore 192 that may be closed at one end. Bore 192 is sized to receive one axial end of yoke 56". A radially inner surface of shaft 38" may define a plurality of splines 194.

Figure 9:
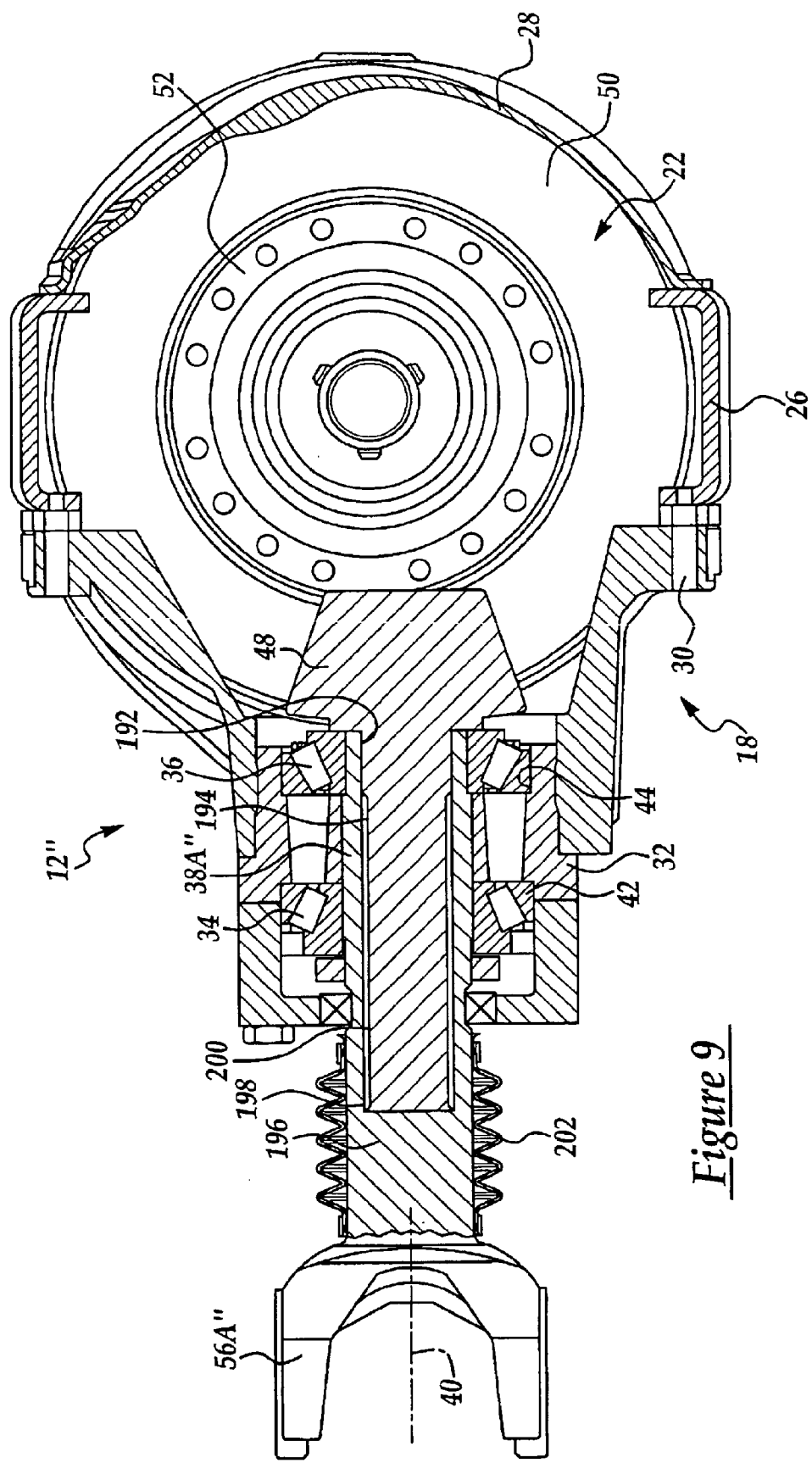
FIG. 9 is a cross-sectional view of a rear axle assembly of a tandem axle assembly in accordance with another embodiment of the present invention.

Yoke 56" is provided to transmit power from intermediate drive shaft 58 to pinion shaft 38" of rear axle assembly 12". Yoke 56" is configured to rotate about axis 40 extending through pinion shaft 38" and pinion gear 48 in rear axle assembly 12". Yoke 56" may include an axially extending yoke shaft 196 having a generally circular body. Although shaft 196 is solid in the illustrated embodiment, it should be understood that shaft 196 may be tubular. A radially outer surface 198 of shaft 196 may define a plurality of splines 200 proximate one axial end configured to mate with splines 194 of pinion shaft 38". The spline connection between pinion shaft 38" and yoke 56" allows shaft 38" and yoke 56" to move axially relative to one another. It should be understood, however, that other structural relationships (e.g., a key and keyway) could be created between shaft 38" and yoke 56" to allow relative axial movement. It should also be understood that the male-female relationship of shaft 38" and yoke 56" may again be reversed as illustrated in FIG. 9 without departing from the spirit of the present invention. In other words, yoke 56"A could define an axially extending bore having a plurality of splines on a radially inner surface while pinion shaft 38"A could be received within the bore and include a plurality of splines configured to mate with the splines on the yoke 56"A.

A boot 202 again may act as a seal between pinion shaft 38" and yoke 56". Boot 202 is coupled to both pinion shaft 38" and yoke 56" and is disposed about axis 40. The axial length of boot 202 is variable to allow for relative axial movement between shaft 38" and yoke 56". As discussed hereinabove in connection with tandem axle assembly 10, a sliding seal may be used as an alternative to boot 202.

As with the slip connection between power transmission shaft 98 and power input shaft 100, the slip connections between output shaft 106' and yoke 54' and between pinion shaft 38" and yoke 56" enable accommodation of variations in driveline length resulting from movement of the rear axle assembly and the vehicle suspension. As a result, the splined slip connection in the drive shaft assembly may be eliminated. This results in a reduction in part count in the drive shaft assembly as well as reduced weight, cost, and assembly time for the drive shaft assembly. Further, driveshaft runout is reduced and driveline balance improved.

Again, while the invention has been shown and described with reference to one or more particular embodiments thereof, it will be understood by those of skill in the art that various changes and modifications can be made without departing from the spirit and scope of the invention. For example, although each of the illustrated embodiments of a tandem axle assembly incorporates only one slip connection from among the slip connections shown between shafts 98, 100 and between shaft 106' and yoke 54' and between shaft 38" and yoke 56", it should be understood that a tandem axle assembly could be designed to incorporate more than one of the illustrated slip connections at the same time.

We claim:

1. A tandem axle assembly, comprising:
   a first axle assembly having:
      a wheel differential; and,
      a pinion shaft drivingly coupled to said wheel differential;
   a second axle assembly having:
      a wheel differential;
      an inter-axle differential configured to divide power between said wheel differentials of said first and second axle assemblies;
      a power input shaft drivingly coupled to said inter-axle differential;
      an output shaft driven by said inter-axle differential; and,
      a power transmission shaft coupled to said power input shaft and a drive shaft assembly; and,
   an intermediate drive shaft assembly having:
      an output yoke driven by said output shaft; and,
      an input yoke drivingly coupled to said pinion shaft
   wherein one member of said power transmission shaft, said power input shaft, said output shaft, said output yoke, said input yoke, and said pinion shaft defines a bore and another member of said power transmission shaft, said power input shaft, said output shaft, said output yoke, said input yoke, and said pinion shaft extends into said bore, said one member axially movable relative to said another member.

2. The tandem axle assembly of claim 1 wherein said one member comprises said power input shaft and said another member comprises said power transmission shaft.

3. The tandem axle assembly of claim 1 wherein said one member comprises said power transmission shaft and said another member comprises said power input shaft.

4. The tandem axle assembly of claim 2 wherein said one member comprises said output shaft and said another member comprises said output yoke.

5. The tandem axle assembly of claim 1 wherein said one member comprises said output yoke and said another member comprises said output shaft.

6. The tandem axle assembly of claim 1 wherein said one member comprises said input yoke and said another member comprises said pinion shaft.

7. The tandem axle assembly of claim 1 wherein said one member comprises said pinion shaft and said another member comprises said input yoke.

8. The tandem axle assembly of claim 1 wherein said first axle assembly comprises a rear axle assembly and said second axle assembly comprises a forward axle assembly.

9. The tandem axle assembly of claim 1 wherein said one member defines a first plurality of splines on a radially inner surface and said another member defines a second plurality of splines configured to mate with said first plurality of splines.

10. A tandem axle assembly comprising:
    a first axle assembly having a first wheel differential;
    a second axle assembly having:
       a second wheel differential;
       an inter-axle differential configured to divide power between said first and second wheel differentials;
       a power input shaft drivingly coupled to said inter-axle differential and disposed about a longitudinal axis; and,
       a power transmission shaft coupled to said power input shaft and a drive shaft assembly and disposed about said axis,
       wherein one of said power input shaft and said power transmission shaft defines an axially extending bore and the other of said power input shaft and said power transmission shaft extends into said bore, said power transmission shaft axially movable relative to said power input shaft.

11. The tandem axle assembly of claim 10 wherein said power input shaft extends outwardly from a housing of said second axle assembly.

12. The tandem axle assembly of claim 10 wherein said power input shaft defines said bore and said power transmission shaft has a first end extending axially into said bore and a second end defining a yoke for coupling to said drive shaft assembly.

13. The tandem axle assembly of claim 10 wherein said second axle assembly further includes a boot coupled to said power input shaft and said power transmission shaft, said boot disposed about said axis and having a variable axial length.

14. The tandem axle assembly of claim 10 wherein said second axle assembly further includes a seal disposed between said power input shaft and said power transmission shaft.

15. The tandem axle assembly of claim 10 wherein said first axle assembly comprises a rear axle assembly and said second axle assembly comprises a forward axle assembly.

16. A tandem axle assembly, comprising:
    a first axle assembly having a first wheel differential;
    a second axle assembly having:
       a second wheel differential;
       an inter-axle differential configured to divide power between said first and second wheel differentials;
       a power input shaft drivingly coupled to said inter-axle differential and disposed about a longitudinal axis; and,
       a power transmission shaft coupled to said power input shaft and a drive shaft assembly and disposed about said axis
       wherein one shaft of said power input shaft and said power transmission shaft defines an axially extending bore and a first plurality of splines on a radially inner surface and the other shaft of said power input shaft and said power transmission shaft extends into said bore and defines a second plurality of splines configured to mate with said first plurality of splines, said one shaft axially movable relative to said other shaft.

17. The tandem axle assembly of claim 16 wherein said power input shaft extends outwardly from a housing of said second axle assembly.

18. The tandem axle assembly of claim 16 wherein said power input shaft defines said bore and said power transmission shaft has a first end extending axially into said bore and a second end defining a yoke for coupling to said drive shaft assembly.

19. The tandem axle assembly of claim 16 wherein said second axle assembly further includes a boot coupled to said power input shaft and said power transmission shaft, said boot disposed about said axis and having a variable axial length.

20. The tandem axle assembly of claim 16 wherein said second axle assembly further includes a seal disposed between said power input shaft and said power transmission shaft.

21. The tandem axle assembly of claim 1 wherein said intermediate drive shaft assembly includes an intermediate drive shaft, said output yoke coupled to one end of said intermediate drive shaft through a first universal joint and said input yoke coupled to an opposite end of said intermediate drive shaft through a second universal joint.

* * * * *

UNITED STATES PATENT AND TRADEMARK OFFICE
CERTIFICATE OF CORRECTION

PATENT NO. : 6,863,634 B2 Page 1 of 1
DATED : March 8, 2005
INVENTOR(S) : James L. Holman and George A. Willford It is certified that error appears in the above-identified patent and that said Letters Patent is hereby corrected as shown below:

Column 9,
Line 48, replace "2" with -- 1 --.

Signed and Sealed this

Seventeenth Day of May, 2005

JON W. DUDAS
*Director of the United States Patent and Trademark Office*